United States Patent
Thaden et al.

(10) Patent No.: US 12,233,707 B2
(45) Date of Patent: Feb. 25, 2025

(54) FUEL DEVICE ASSEMBLIES, VALVE ASSEMBLIES, AND VEHICLES INCLUDING SAME

(71) Applicant: Toyoda Gosei Co., Ltd., Kiyosu (JP)

(72) Inventors: Alexander Thaden, Oak Park, MI (US); Caleb Bauer, Brighton, MI (US); Steven Yurgalonis, Sterling Heights, MI (US)

(73) Assignee: Toyoda Gosei Co., LTD., Kiyosu (JP)

( * ) Notice: Subject to any disclaimer, the term of this patent is extended or adjusted under 35 U.S.C. 154(b) by 596 days.

(21) Appl. No.: 17/665,095

(22) Filed: Feb. 4, 2022

(65) Prior Publication Data
US 2023/0249541 A1 Aug. 10, 2023

(51) Int. Cl.
*B60K 15/03* (2006.01)

(52) U.S. Cl.
CPC .... *B60K 15/03* (2013.01); *B60K 2015/03256* (2013.01)

(58) Field of Classification Search
CPC .............. B60K 15/03; B60K 15/03519; B60K 2015/03256
See application file for complete search history.

(56) References Cited

U.S. PATENT DOCUMENTS

| | | | | |
|---|---|---|---|---|
| 5,215,132 | A * | 6/1993 | Kobayashi | B60K 15/03519 96/108 |
| 5,960,816 | A * | 10/1999 | Mills | F16K 24/044 137/202 |
| 6,311,675 | B2 * | 11/2001 | Crary | F02M 37/20 137/202 |
| 7,147,017 | B2 | 12/2006 | Leonhardt | |
| 8,616,232 | B2 * | 12/2013 | Suzuki | B60K 15/03519 137/202 |
| 10,017,050 | B2 * | 7/2018 | Ogose | F16K 24/044 |
| 11,009,147 | B2 * | 5/2021 | Mihara | F16K 31/22 |
| 11,724,592 | B2 * | 8/2023 | Thaden | B60K 15/05 220/563 |
| 2006/0108000 | A1 | 5/2006 | Kaneko et al. | |
| 2007/0144580 | A1 | 6/2007 | Kaneko | |
| 2023/0025882 | A1 * | 1/2023 | Bauer | B60K 15/035 |

* cited by examiner

*Primary Examiner* — Umashankar Venkatesan
(74) *Attorney, Agent, or Firm* — Dinsmore & Shohl LLP

(57) ABSTRACT

A valve assembly includes a case, a bottom cap provided at a lower end of the case, a lower float provided within an open interior of the case, an upper float provided within the open interior of the case between the lower float and the upper end of the case, and a biasing member biasing the lower float and the upper float toward the upper end of the case. The lower float includes a canister having an upper end and a rim extending from the upper end of the canister. A pair of openings is formed within the rim adjacent the upper end of the canister and partially defined by a curvilinear edge. The upper float includes a pair of legs, each leg received within a corresponding opening.

20 Claims, 6 Drawing Sheets

FUEL DEVICE ASSEMBLIES, VALVE ASSEMBLIES, AND VEHICLES INCLUDING SAME

TECHNICAL FIELD

The present specification generally relates to a fuel device assembly mounted within a fuel tank of a vehicle and, more specifically, a fuel device assembly including a valve assembly mounted within a fuel tank of the vehicle.

BACKGROUND

In automobiles, valve assemblies mounted within a fuel tank of a vehicle control the flow of fuel throughout the fuel tank. Examples of the valve assembly include a vehicle grade-vent valve for allowing fuel tanks to vent properly when the vehicle is parked on a grade, and a fuel shut-off valve operating as a full-tank detection valve for detecting the full-tank state during refueling.

Such valve assemblies may include an upper float movably received within a lower float configured to open an close a port to control the flow of fuel into and out of the valve assembly. An upper surface of the upper float may form a fluid tight seal with the port to close the port. However, in certain situations, the upper float may not form a fluid tight seal with the port due to misalignment of the lower float and the upper float. Additionally, misalignment of the lower float and the upper float may result in the upper float becoming stuck against the port, thereby keeping it closed when it should be opened.

Accordingly, a need exists for improved valve assemblies including a lower float and an upper float that permits that permits proper alignment such that the upper float can more effectively seal and unseal a port of the valve assembly.

SUMMARY

In one embodiment, a valve assembly includes: a case having an upper end, an opposite lower end, and an open interior; a bottom cap provided at the lower end of the case; a lower float provided within the open interior of the case, the lower float including: a canister having an upper end; and a rim extending from the upper end of the canister, a pair of openings formed within the rim adjacent the upper end of the canister and partially defined by a curvilinear edge; an upper float provided within the open interior of the case between the canister of the lower float and the upper end of the case, the upper float including a pair of legs, each leg received within a corresponding opening; and a biasing member biasing the lower float and the upper float toward the upper end of the case.

In another embodiment, a fuel device assembly includes: a valve assembly including: a case having an upper end, an opposite lower end, and an open interior; a bottom cap provided at the lower end of the case; a lower float provided within the open interior of the case, the lower float including: a canister having an upper end; and a rim extending from the upper end of the canister, a pair of openings formed within the rim adjacent the upper end of the canister and partially defined by a curvilinear edge; an upper float provided within the open interior of the case between the canister of the lower float and the upper end of the case, the upper float including a pair of legs, each leg received within a corresponding opening; and a biasing member biasing the lower float and the upper float toward the upper end of the case; a valve cover provided at the upper end of the case; and a weld plate provided at an upper end of the valve cover coupling the valve assembly to an interior-facing surface a fuel tank of a vehicle.

In yet another embodiment, a vehicle includes: a fuel tank defining an interior; and a fuel device assembly provided within the interior of the fuel tank, the fuel device assembly including: a valve assembly including: a case having an upper end, an opposite lower end, and an open interior; a bottom cap provided at the lower end of the case; a lower float provided within the open interior of the case, the lower float including: a canister having an upper end; and a rim extending from the upper end of the canister, a pair of openings formed within the rim adjacent the upper end of the canister and partially defined by a curvilinear edge; an upper float provided within the open interior of the case between the canister of the lower float and the upper end of the case, the upper float including a pair of legs, each leg received within a corresponding opening; and a biasing member biasing the lower float and the upper float toward the upper end of the case; a valve cover provided at the upper end of the case; and a weld plate provided at an upper end of the valve cover coupling the valve assembly to an interior-facing surface the fuel tank.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
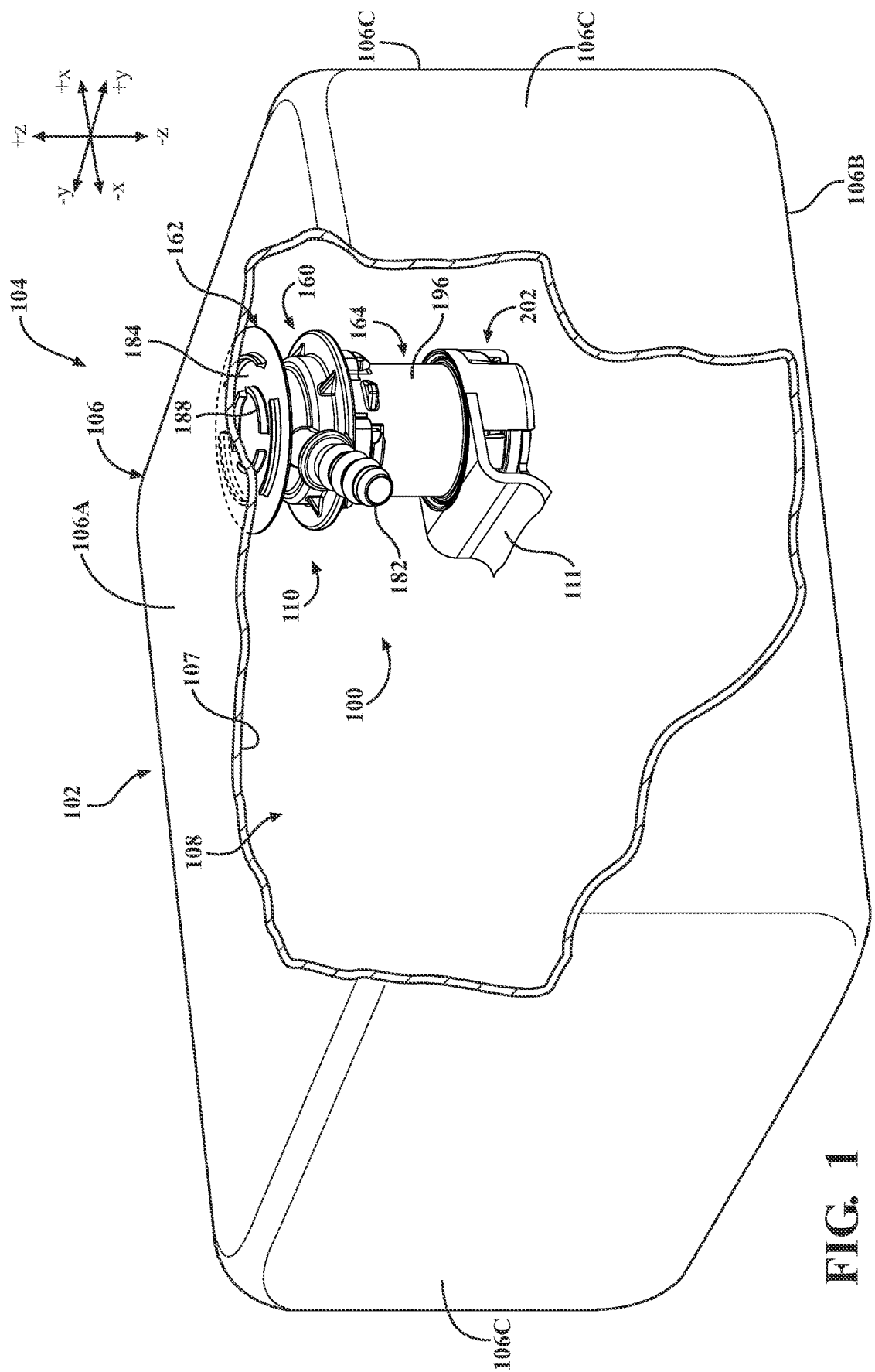
FIG. 1 schematically depicts a perspective view of a fuel device assembly positioned within a fuel tank of a vehicle, according to one or more embodiments shown and described herein.

Embodiments described herein are directed to fuel device assemblies, valve assemblies, and vehicles including fuel device assemblies within a fuel tank. The fuel device assemblies include a valve assembly including a case, a bottom cap provided at a lower end of the case, a lower float provided within an open interior of the case, and an upper float provided within the open interior of the case between the lower float and an upper end of the case. The lower float includes a canister and a rim extending from an upper end of the canister. A pair of openings are formed within the rim adjacent the upper end of the canister and partially defined by a curvilinear edge. The upper float includes a pair of legs received within a corresponding opening. A biasing member biases the lower float and the upper float toward the upper end of the case. Various embodiments of the fuel device assemblies are described in more detail herein. Whenever possible, the same reference numerals will be used throughout the drawings to refer to the same or like parts.

As used herein, the term "vehicle longitudinal direction" refers to the forward-rearward direction of the vehicle (i.e., in the +/−Y direction of the coordinate axes depicted in FIG. 1). The term "vehicle lateral direction" refers to the cross-vehicle direction (i.e., in the +/−X direction of the coordinate axes depicted in FIG. 1), and is transverse to the vehicle longitudinal direction. The term "vehicle vertical direction" refers to the upward-downward direction of the vehicle (i.e., in the +/−Z direction of the coordinate axes depicted in FIG. 1). As used herein, "upper" and "above" are defined as the positive Z direction of the coordinate axes shown in the drawings. "Lower" and "below" are defined as the negative Z direction of the coordinate axes shown in the drawings. It is appreciated that the vehicle lateral direction and the vehicle longitudinal direction may be interchanged based on the installation direction of the fuel tank with respect the vehicle.

Referring now to FIG. 1, a fuel device assembly 100 is illustrated according to one or more embodiments described herein. The fuel device assembly 100 is mounted within a fuel tank 102 of a vehicle 104. The fuel tank 102 includes one or more walls 106 such as a top wall 106A, an opposite bottom wall 106B, and a plurality of side walls 106C. The one or more walls 106 of the fuel tank 102 define an interior 108 in which the fuel device assembly 100 is provided.

The fuel device assembly 100 may generally include a valve assembly 110, a valve cover 160 provided at an upper end of the valve assembly 110, and a weld plate 162 provided at an upper end of the valve cover 160 coupling the valve assembly 110 to an interior-facing surface 107 of one of the walls 106, such as the top wall 106A, the fuel tank 102. However, it should be appreciated that the fuel device assembly 100 may be mounted to any suitable portion of the fuel tank 102 such as, for example a side wall 106C of the fuel tank 102. In embodiments, the valve assembly 110 is any suitable valve, for example, a vehicle grade vent valve or a fuel shut-off valve. As is known in the art, vehicle grade vent valves allows a fuel tank to properly vent when the vehicle is parked on an incline. Additionally, as is known in the art, fuel shut-off valves operate as a full-tank detection valve for detecting the full-tank state during refueling. Additionally, fuel shut-off valves function as a cutoff valve for preventing liquid fuel from flowing into an evaporation circuit while driving or being transported.

In embodiments, the fuel device assembly 100 includes a fuel accessory such as, for example, a baffle plate to which the valve assembly 110 is coupled via an extension member 111 extending from the valve assembly 110. The fuel accessory, such as the baffle plate, may be suspended within the fuel tank 102 via the valve assembly 110, thereby directing or otherwise controlling the flow of fuel within the fuel tank 102.

Figure 2:
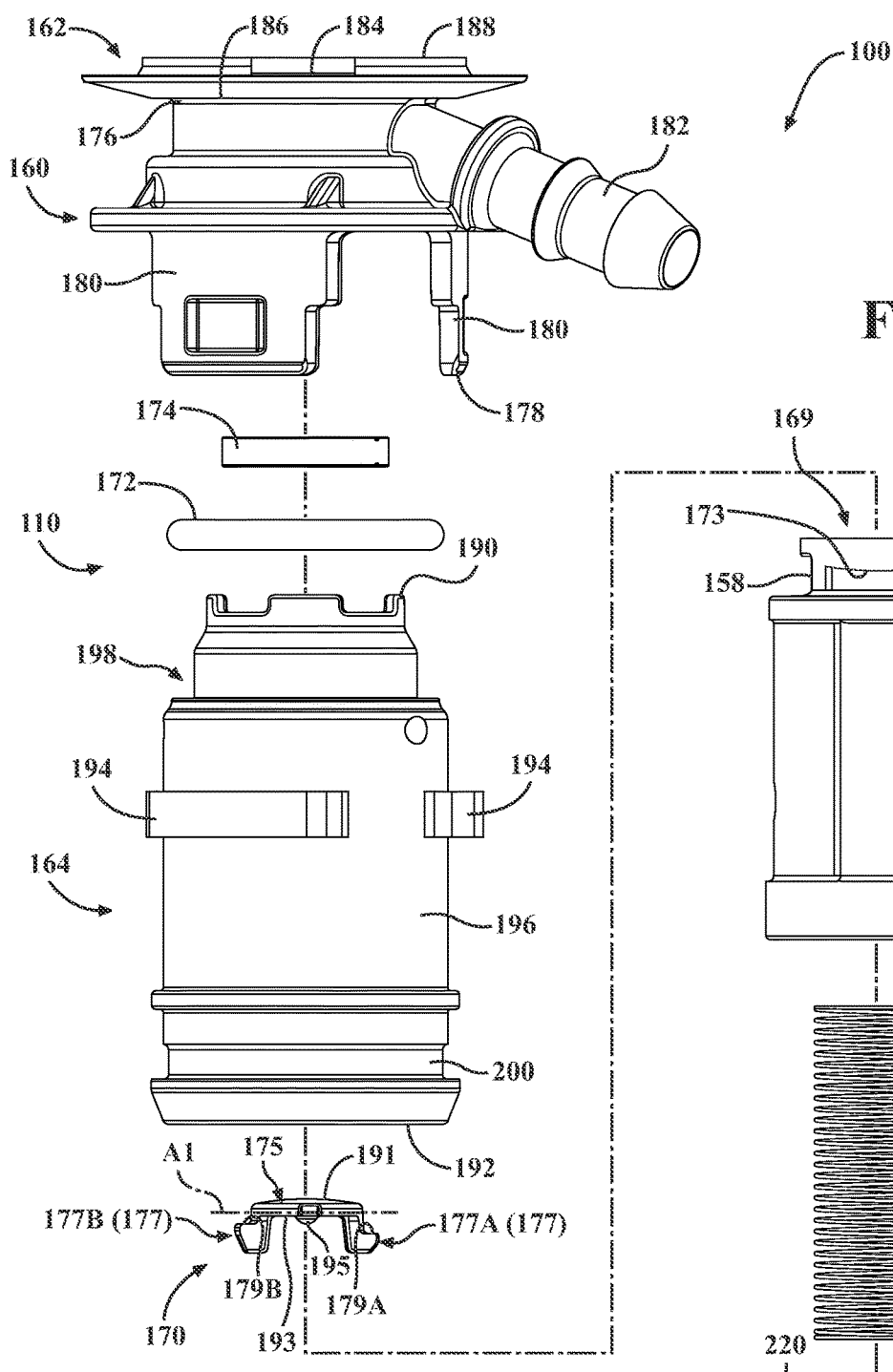
FIG. 2 schematically depicts an exploded view of the fuel device assembly of FIG. 1, according to one or more embodiments shown and described herein.

Referring now to FIG. 2, an exploded view of the valve assembly 110 is shown. In embodiments, the fuel device assembly 100 includes the valve cover 160, the weld plate 162, and the valve assembly 110. The valve assembly 110 includes a case 164, a lower float 166 positionable within the case 164, a biasing member 168 positionable within the lower float 166, an upper float 170 positionable within the case 164 and at an upper end of the lower float 166, an O-ring 172 surrounding an upper end 190 of the case 164, and a metal disc 174 provided within the upper end 190 of the case 164. In embodiments, the components of the valve assembly 110, other than the metal disc 174, the O-ring 172, and the biasing member 168 may be formed of plastic.

In embodiments, the valve cover 160 has an upper end 176 and an opposite lower end 178 defining a plurality of fingers 180 for lockingly engaging the case 164, as described in more detail herein. The valve cover 160 also includes a nipple 182 extending proximate the upper end 176 thereof and outwardly in a substantially radial direction. It should be appreciated that the nipple 182 transports gas out of the valve assembly 110 to prevent a rise in gas pressure within the fuel tank 102.

When provided, the weld plate 162 is located at the upper end 176 of the valve cover 160 and includes an upper surface 184 opposite the valve cover 160, and an opposite lower surface 186. In embodiments, the weld plate 162 is integrally formed as a one-piece, monolithic structure with the valve cover 160 such that the weld plate 162 and the valve cover 160 are integrally molded as a one-piece, monolithic structure. In other embodiments, the lower surface 186 of the weld plate 162 is mounted or otherwise fixed to the upper end 176 of the valve cover 160. The weld plate 162 includes a weld pad 188 formed at the upper surface 184 of the weld plate 162 for fixing the weld plate 162 and, thus, the valve assembly 110, to the fuel tank 102. In other embodiments, the valve assembly 110 may be coupled to the fuel tank 102, such as by the fuel accessory or the extension member 111 being fixed to the fuel tank 102 rather than the valve assembly 110 itself via the valve cover 160 and the weld plate 162.

The case 164 has a substantially tubular shape and includes the open upper end 190 and an opposite open lower end 192. A plurality of receiving slots 194 is formed on an outer circumferential surface 196 of the case 164 for engaging the valve cover 160, specifically the fingers 180 of the valve cover 160. The receiving slots 194 are spaced apart from each other in a circumferential direction. Each receiving slot 194 protrudes from the circumferential surface 196 of the case 164 outward in a radial direction. In embodiments, the case 164 has a reduced diameter portion 198 at the upper end 190 for receiving the O-ring 172 and a groove 200 formed at the lower end 192 of the case 164 for engaging a bottom cap 202 when provided at the lower end 192 of the case 164, described in more detail herein.

The lower float 166 also has a substantially tubular shape and includes a canister 167 having an upper end 204 and an opposite lower end 206. The lower float 166 further includes a rim 169 extending from the upper end 204 of the canister 167. A pair of openings 171 are formed within the rim 169 adjacent the upper end 204 of the canister 167. The pair of openings 171 are further defined by a curvilinear edge 173 provided opposite the upper end 204 of the canister 167. The curvilinear edge 173 has a radius of curvature. More particularly, the curvature of the curvilinear edge 173 defines a convex surface. The rim 169 includes a plurality of upstanding walls 158 extending between the curvilinear edge 173 and the upper end 204 of the canister 167 to further define the pair of openings 171

The upper float 170 is positionable at the upper end 204 of the canister 167 of the lower float 166. More particularly, the upper float 170 includes an upper float body 175 and a pair of legs 177. The pair of legs 177 includes a first leg 177A and a second leg 177B. The pair of legs 177 are provided on opposite ends of the upper float body 175 along a longitudinal axis A1 of the upper float 170. The first leg 177A is partially defined by an upper planar surface 179A and the second leg 177B is similarly partially defined by an upper planar surface 179B. When the upper float 170 is positioned within the lower float 166, each leg 177 is received within a corresponding opening 171 defined between the canister 167 and the rim 169 of the lower float 166. More particularly, the upper planar surfaces 179A, 179B of each leg 177 face the curvilinear edge 173 of the lower float 166 such that the convex surface of the curvilinear edge 173 extends toward a corresponding upper planar surface 179A, 179B of each leg 177. As such, the upper planar surfaces 179A, 179B are non-planar with the curvilinear edge 173 of the lower float 166 to permit rocking of the of the upper float 170 relative to the lower float 166, as discussed in more detail herein. As discussed in more detail herein, the upper float body 175 has an upper surface 191, an opposite lower surface 193, and a protrusion 195 extending from the lower surface 193.

The biasing member 168 such as, for example, a spring, extends through the lower end 192 of the case 164 and the lower end 206 of the canister 167 of the lower float 166 to bias the lower float 166 toward the upper end 190 of the case 164. As such, the biasing member 168 is at least partially positioned within the case 164.

The biasing member 168 is retained in position within the lower float 166 by the bottom cap 202, which, in embodiments, lockingly engages the case 164. In embodiments, the bottom cap 202 has an open upper end 208 and a tapered bottom end 210. A plurality of engaging members 212 is formed on an outer circumferential surface 214 of the bottom cap 202 for engaging the groove 200 formed at the lower end 192 of the case 164. The engaging members 212 are spaced from each other in a circumferential direction. Each engaging member 212 defines a cutout 216 and a locking claw 218 extending from an upper edge 220 of the engaging member 212 defining the cutout 216. The locking claw 218 extends radially inwardly from the upper edge 220 of the engaging member 212 and is resiliently attached to the upper edge 220 of the engaging member 212. Thus, the locking claws 218 are capable of flexing outwardly to permit the case 164 to be received and seated within the bottom cap 202 and the locking claws 218 engage the groove 200 formed at the lower end 192 of the case 164 once the case 164 is fully seated within the bottom cap 202. As discussed herein, the extension member 111 extends from the bottom cap 202 to couple the valve assembly 110 to a fuel accessory or, in some embodiments, to the fuel tank 102.

Figure 3:
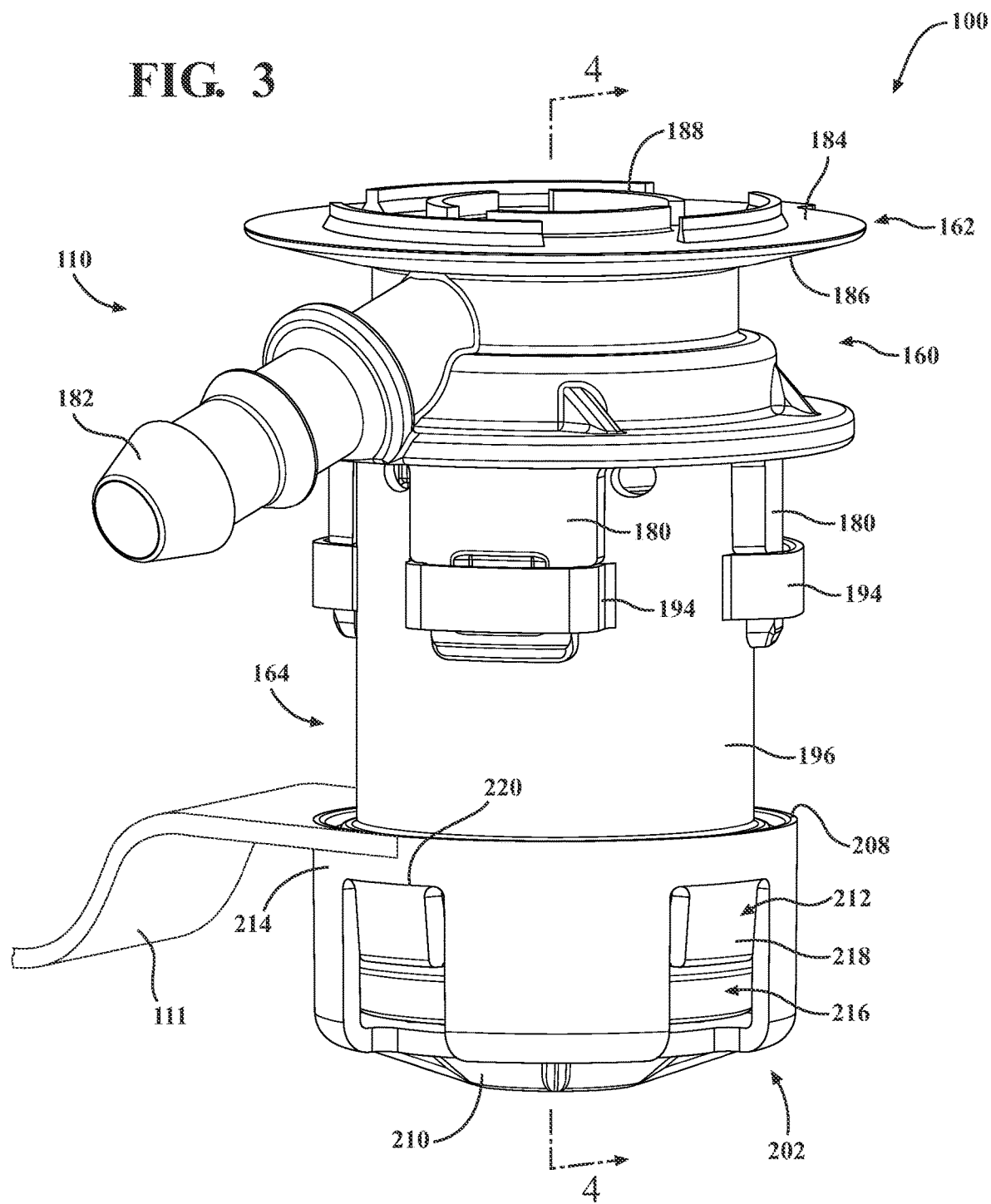
FIG. 3 schematically depicts a perspective view of the fuel device assembly of FIG. 1 in an assembled state, according to one or more embodiments shown and described herein.

As shown in FIG. 3, the fuel device assembly 100 is shown in an assembled state with the valve cover 160 positioned at the upper end 190 (FIG. 2) of the case 164 such that the fingers 180 each extend within and engage a corresponding one of the receiving slots 194 to lockingly engage the valve cover 160 to the case 164. Additionally, the case 164 is shown fully seated within the bottom cap 202 such that the locking claw 218 of each of the engaging members 212 engages the groove 200 formed in the case 164, thereby locking the bottom cap 202 to the case 164. In other embodiments, the bottom cap 202 may be provided at the lower end 192 of the case 164 and integrally formed with the case 164 as a one-piece monolithic structure.

Figure 4:
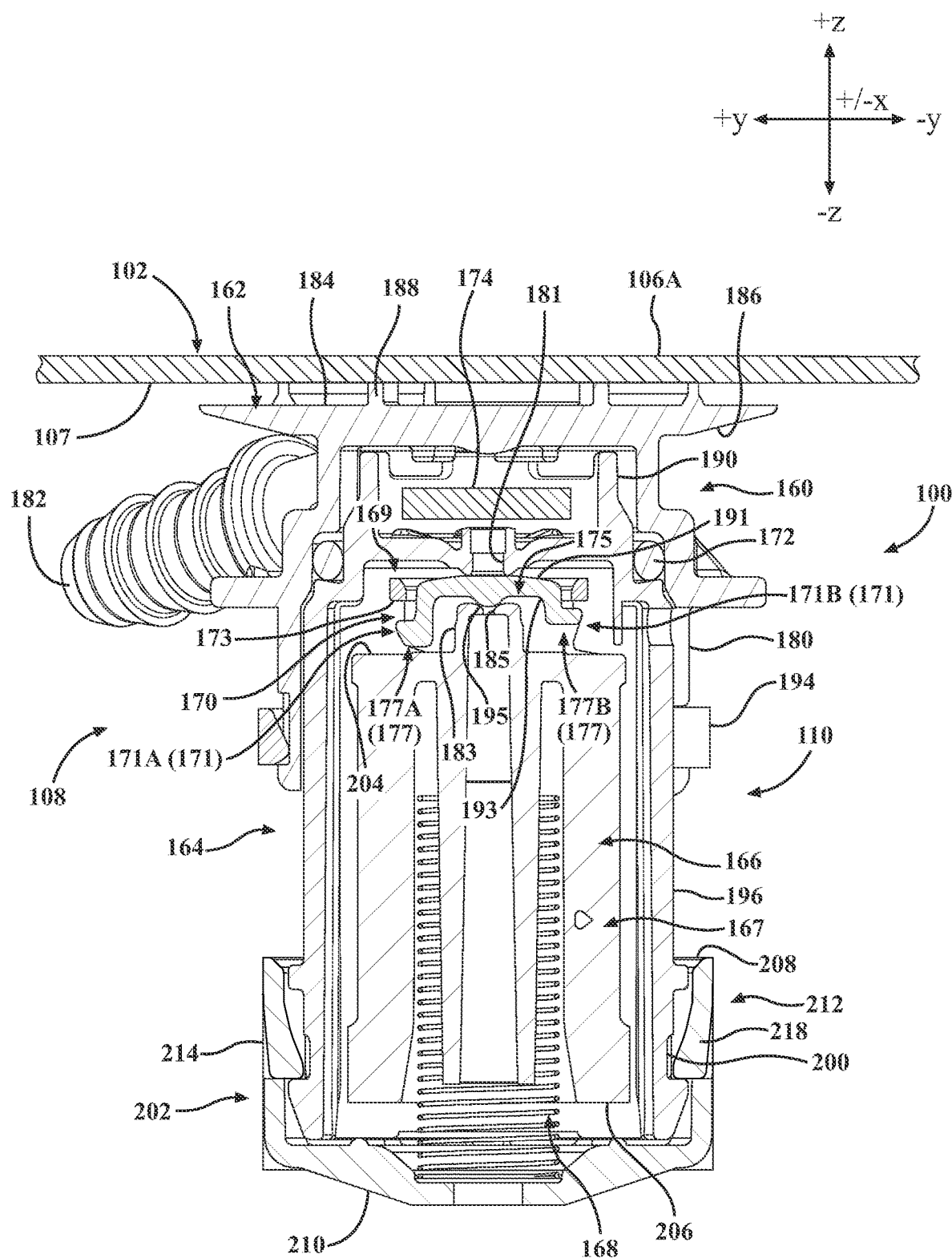
FIG. 4 schematically depicts a cross-sectional view of the fuel device assembly of FIG. 1 taken along line 4-4 of FIG. 3 and positioned within the fuel tank, according to one or more embodiments shown and described herein.

Referring now to FIG. 4, the fuel device assembly 100 is shown in the assembled state and positioned within the fuel tank 102 of the vehicle 104 and fixed to the interior-facing surface 107 of the fuel tank 102 such as, for example, the top wall 106A of the fuel tank 102, as shown, via the weld pad 188 formed at the upper surface 184 of the weld plate 162. In some embodiments, the extension member 111 may extend from the bottom cap 202 to couple the valve assembly 110 to a fuel accessory or the fuel tank 102. A port 181 is formed in the case 164 for permitting fluid flow through the case 164. As discussed in more detail herein, the port 181 may be sealed and unsealed by the upper float 170 as the biasing force of the biasing member 168 raises and lowers the lower float 166 and subsequently the upper float 170.

Figure 5:
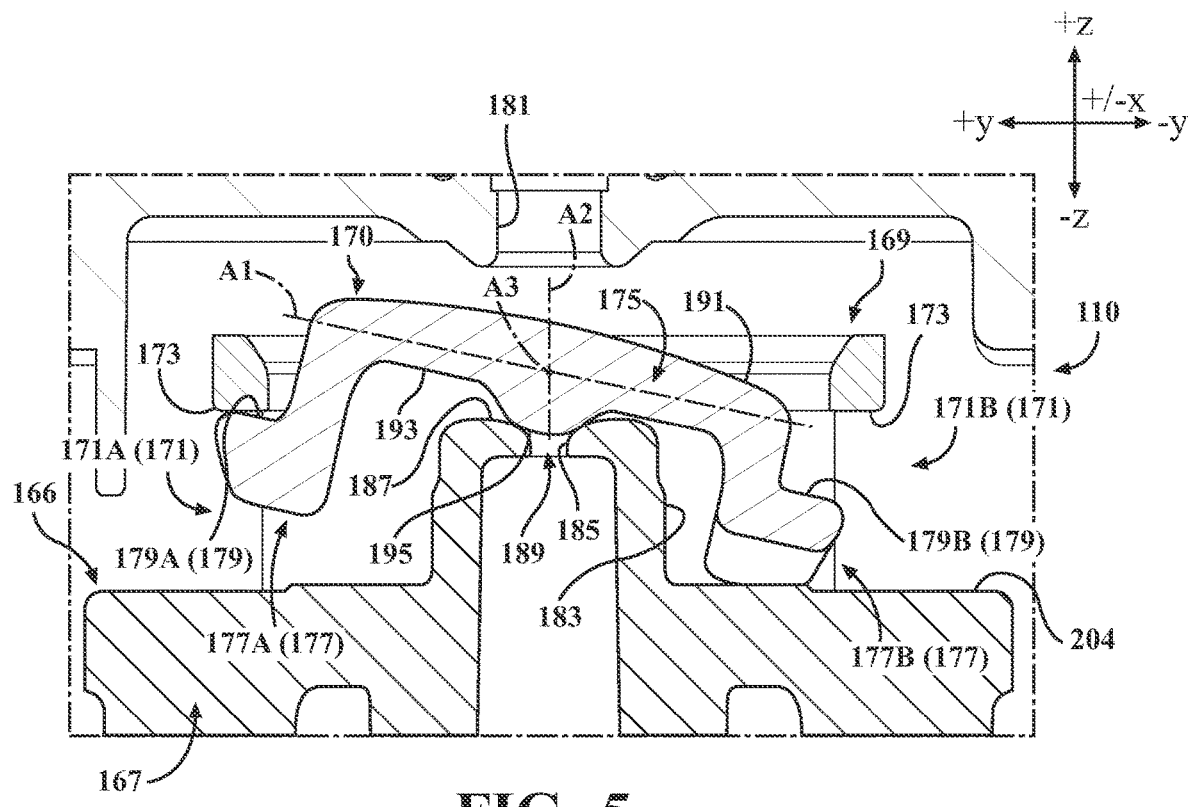
FIG. 5 schematically depicts an enlarged, partial cross-sectional view of the fuel device assembly of FIG. 1 with an upper valve in a first longitudinal rotation position, according to one or more embodiments shown and described herein.
Figure 6:
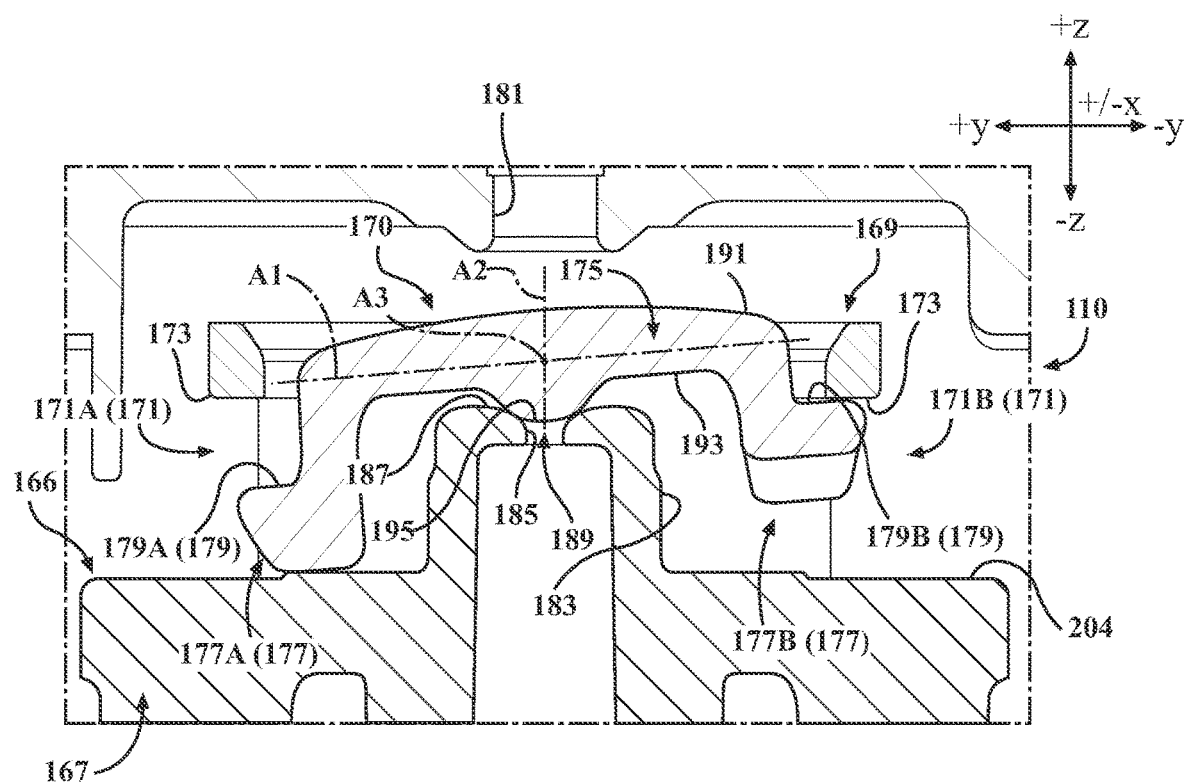
FIG. 6 schematically depicts an enlarged, partial cross-sectional view of the fuel device assembly of FIG. 1 with the upper valve in a second longitudinal rotation position, according to one or more embodiments shown and described herein.

Referring now to FIGS. 5 and 6, an enlarged view of the upper float 170 positioned at the upper end 204 of the canister 167 is illustrated. As shown, the lower float 166 includes a projection 183 formed at the upper end 204 of the canister 167 extending axially toward the rim 169. A cavity 185 is formed at an upper surface 187 of the projection 183 and defines a through hole 189 extending through the projection 183 of the lower float 166. The cavity 185 is recessed with respect to the upper surface 187 of the projection 183. As such, the cavity 185 at least partially extends into the through hole 189. The cavity 185 may have a semicircular shape defined by a concave surface.

As shown, the pair of legs 177 are provided on opposite sides of the upper float 170 and positioned along the longitudinal axis A1 of the upper float 170. As discussed herein, the upper float 170 includes an upper float body 175 having an upper surface 191 and an opposite lower surface 193. The upper float 170 further includes a protrusion 195 extending from the lower surface 193 of the upper float body 175 in a direction opposite the upper surface 191. The shape of the protrusion 195 generally corresponds to the shape of the cavity 185 to permit the protrusion 195 to be at least partially received within the cavity 185 and movable therein. In embodiments in which the cavity 185 is defined by a concave surface, the protrusion 195 may be defined by a convex surface corresponding to the concave surface of the cavity 185.

When the upper float 170 is positioned on the upper end 204 of the canister 167 of the lower float 166, the protrusion 195 of the upper float 170 is partially received or nests within the cavity 185 to permit the upper float 170 to pivot relative to the lower float 166. More particularly, the protrusion 195 being received within the cavity 185 facilitates pivoting or rocking of the upper float 170 relative to the lower float 166 about the longitudinal axis A1 and about a lateral axis A3 extending perpendicular to the longitudinal axis A1, as described in more detail herein.

As shown in FIG. 5, the upper float 170 is positioned in a first longitudinal rotation position such that the upper float 170 is pivoted in a first longitudinal direction about the lateral axis A3 such that the first leg 177A, particularly the upper planar surface 179A of the first leg 177A, is positioned against the curvilinear edge 173 defining one of the openings 171A of the pair of openings 171. Alternatively, as shown in FIG. 6, the upper float 170 is positioned in a second longitudinal rotation position such that the upper float 170 is pivoted in a second longitudinal direction about the lateral axis A3 such that the second leg 177B, particularly the upper planar surface 179B of the second leg 177B, is positioned against the curvilinear edge 173 defining the other opening 171B of the pair of openings 171. Engagement of the protrusion 195 within the cavity 185 permits the upper float 170 to move between the first longitudinal rotation position and the second longitudinal rotation position. Additionally, it should be understood that the upper float 170 is positionable into a plurality of intermediate longitudinal rotation positions between the first longitudinal rotation position and the second longitudinal rotation position as the upper float 170 pivots about the lateral axis A3.

Figure 7:
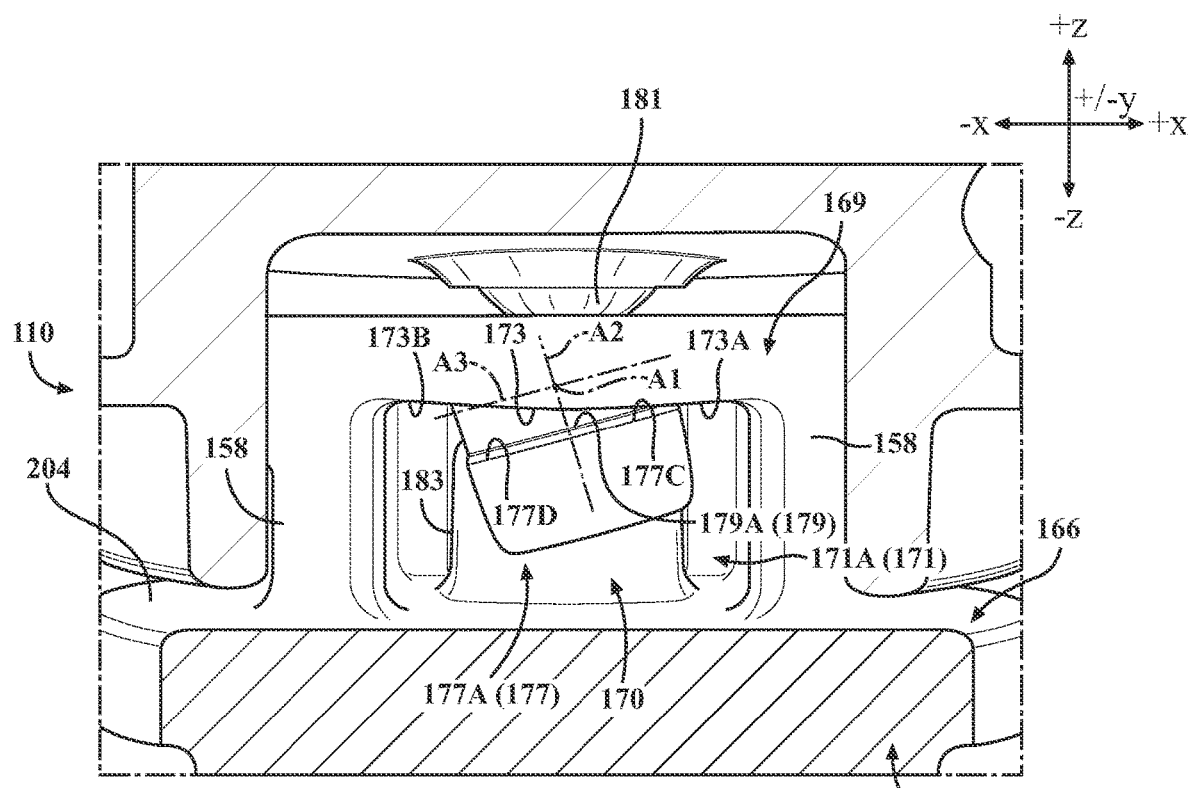
FIG. 7 schematically depicts an enlarged, partial cross-sectional view of the fuel device assembly of FIG. 1 with the upper valve in a first lateral rotation position, according to one or more embodiments shown and described herein.
Figure 8:
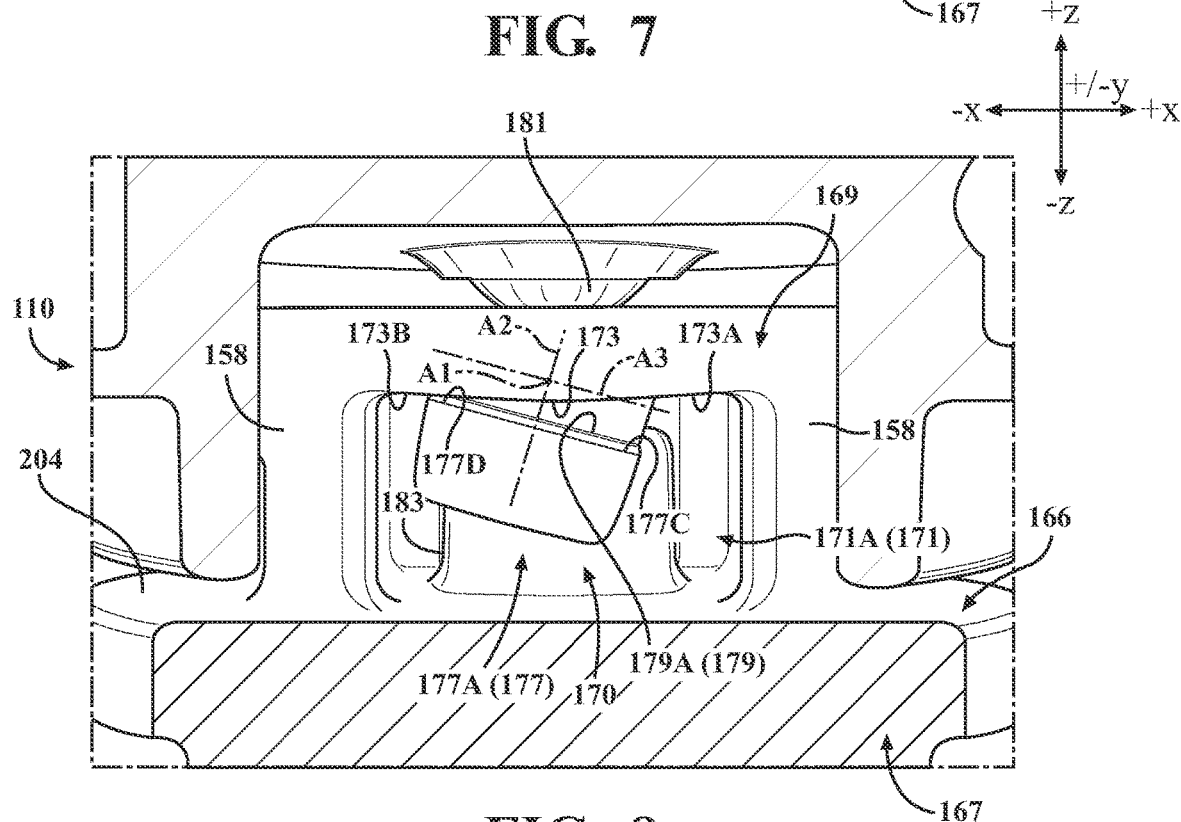
FIG. 8 schematically depicts an enlarged cross-sectional view of the fuel device assembly of FIG. 2 with the upper valve in a second lateral rotation position, according to one or more embodiments shown and described herein.

Referring now to FIGS. 7 and 8, movement of the upper float 170 relative to the lower float 166 about the longitudinal axis A1 is shown. As shown in FIG. 7, the upper float 170 is positioned in a first lateral rotation position such that the upper float 170 is pivoted in a first lateral direction about the longitudinal axis A1 such that a first end 177C of each leg 177 is raised relative to an opposite second end 177D of each leg 177 and positioned against a first end 173A of the curvilinear edge 173 defining the openings 171. As such, an opposite second end 177D of each leg 177 is lowered to be spaced apart from the curvilinear edge 173, particularly a second end 173B of the curvilinear edge 173 opposite the first end 173A thereof. Alternatively, as shown in FIG. 8, the upper float 170 is positioned in a second lateral rotation position such that the upper float 170 is pivoted in a second lateral direction about the longitudinal axis A1 such that the second end 177D of each leg 177 is raised relative to the first end 177C thereof and positioned against the opposite second end 173B of the curvilinear edge 173. A first distance extends between the upper end 204 of the canister 167 and the first end 173A of the curvilinear edge 173, and a second distance extends between the upper end 204 of the canister 167 and the second end 173B of the curvilinear edge 173. In embodiments, the first distance is equal to the second distance. Additionally, a third distance extends between the upper end 204 of the canister 167 and a medial location between the first end 173A and the second end 173B of the curvilinear edge 173. Due to the curvilinear edge 173 defining a convex surface, the third distance is less than each of the first distance and the second distance. Engagement of the protrusion 195 within the cavity 185 permits the upper float 170 to move between the first lateral rotation position and the second lateral rotation position. Additionally, it should be understood that the upper float 170 is positionable into a plurality of intermediate lateral rotation positions between the first lateral rotation position and the second lateral rotation position as the upper float 170 pivots about the longitudinal axis A1.

It should be appreciated that pivoting of the upper float 170 about the lateral axis A3 and the longitudinal axis A1, as discussed herein, allows for more efficient sealing and unsealing of the port 181 formed in the case 164 such as by providing a flush contact between the upper surface 191 of the upper float body 175 and the port 181. More particularly, this provides more efficient sealing at the port 181 by allowing the upper float 170 to move in a combination of rotation and pivoting directions along the curvilinear edge 173 to form a flush seal against the port 181 as the fluid pressure within the case 164 increases and force applied by the lower float 166 in the upward vehicle vertical direction increases. Conversely, the ability of the upper float 170 to rotate and pivot relative to the port 118 and along the curvilinear edge 173 allows the upper float 170 to more efficiently unseal or separate from the port 181. Specifically, when the fluid pressure within the case 164 decreases as the fuel level drops, the force applied on the upper float 170 by the lower float 166 decreases as the lower float 166 moves in a downward vehicle vertical direction and, thus, permits the upper float 170 to separate from the port 181. Additionally, the curvilinear edge 173 permits the upper float 170 to separate or break away from the port 181 with any change in the downward vehicle vertical direction.

Additionally, it should be appreciated that pivoting of the upper float 170 relative to the lower float 166 about a vertical axis A2 is restricted by contact of one of the legs 177 against an adjacent one of the plurality of upstanding walls 158. The vertical axis A2 extends perpendicular to the longitudinal axis A1 and the lateral axis A3. As such, the upper float 170 is positionable into a plurality of intermediate positions as the upper float 170 rotates and pivots relative to the lower float 166 about each of the longitudinal axis A1, the vertical axis A2, and the lateral axis A3 due to the protrusion 195 being at least partially received within the cavity 187 and rotating therewithin.

From the above, it is to be appreciated that defined herein are valve assemblies, fuel device assemblies, and vehicles including fuel device assemblies within a fuel tank of the vehicle. In particularly, the valve assembly is mounted to an interior-facing surface of the fuel tank and includes a lower float and an upper float movably positioned within the lower float. Accordingly, the upper float is permitted to pivot relative to the lower float and against a curvilinear edge defining openings in the lower float such that the upper float forms a fluid tight seal with a port formed in the valve assembly. Additionally, the upper float being permitted to pivot relative to the lower float prevents the upper float from becoming stuck against the port and allows for the upper float to separate from the port with ease.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A valve assembly comprising:
   a case having an upper end, an opposite lower end, and an open interior;
   a bottom cap provided at the lower end of the case;
   a lower float provided within the open interior of the case, the lower float comprising:
      a canister having an upper end; and
      a rim extending from the upper end of the canister, a pair of openings formed within the rim adjacent the upper end of the canister and partially defined by a curvilinear edge;
   an upper float provided within the open interior of the case between the canister of the lower float and the upper end of the case, the upper float including a pair of legs, each leg received within a corresponding opening; and
   a biasing member biasing the lower float and the upper float toward the upper end of the case.

2. The valve assembly of claim 1, wherein the upper float includes an upper float body extending between the pair of legs and a protrusion extending from a lower surface of the upper float body, the lower float has a cavity formed therein and a through hole extending through the cavity, and the protrusion of the upper float is partially received within the cavity to permit the upper float to pivot relative to the lower float.

3. The valve assembly of claim 2, wherein the protrusion is defined by a convex surface and the cavity is defined by a concave surface corresponding to the convex surface.

4. The valve assembly of claim 1, wherein each leg of the pair of legs is partially defined by an upper planar surface facing the curvilinear edge of the rim.

5. The valve assembly of claim 1, wherein the pair of legs are provided on opposite sides of the upper float and provided along a longitudinal axis of the upper float, the upper float is pivotable relative to the lower float about the longitudinal axis and a lateral axis extending perpendicular to the longitudinal axis.

6. The valve assembly of claim 5, wherein the rim further comprises a plurality of upstanding walls, the plurality of upstanding walls extending between the curvilinear edge and the upper end of the canister to further define the pair of openings.

7. The valve assembly of claim 6, wherein pivoting of the upper float relative to the lower float about a vertical axis extending perpendicular to the lateral axis and the longitudinal axis is restricted by contact of one of the pair of legs against an adjacent one of the plurality of upstanding walls.

8. A fuel device assembly comprising:
 a valve assembly comprising:
  a case having an upper end, an opposite lower end, and an open interior;
  a bottom cap provided at the lower end of the case;
  a lower float provided within the open interior of the case, the lower float comprising:
   a canister having an upper end; and
   a rim extending from the upper end of the canister, a pair of openings formed within the rim adjacent the upper end of the canister and partially defined by a curvilinear edge;
  an upper float provided within the open interior of the case between the canister of the lower float and the upper end of the case, the upper float including a pair of legs, each leg received within a corresponding opening; and
  a biasing member biasing the lower float and the upper float toward the upper end of the case;
 a valve cover provided at the upper end of the case; and
 a weld plate provided at an upper end of the valve cover coupling the valve assembly to an interior-facing surface a fuel tank of a vehicle.

9. The fuel device assembly of claim 8, wherein the valve cover is positioned at the upper end of the case and lockingly engages the case.

10. The fuel device assembly of claim 8, wherein the bottom cap lockingly engages the case.

11. The fuel device assembly of claim 8, wherein an extension member extends from the bottom cap coupling the valve assembly to a fuel accessory within the fuel tank of the vehicle.

12. The fuel device assembly of claim 8, wherein the upper float includes an upper float body extending between the pair of legs and a protrusion extending from a lower surface of the upper float body, the lower float has a cavity formed therein and a through hole extending through the cavity, and the protrusion of the upper float is partially received within the cavity to permit the upper float to pivot relative to the lower float.

13. The fuel device assembly of claim 12, wherein the protrusion is defined by a convex surface and the cavity is defined by a concave surface corresponding to the convex surface.

14. The fuel device assembly of claim 8, wherein each leg of the pair of legs is partially defined by an upper planar surface facing the curvilinear edge of the rim.

15. The fuel device assembly of claim 8, wherein the pair of legs are provided on opposite sides of the upper float and provided along a longitudinal axis of the upper float, the upper float is pivotable relative to the lower float about the longitudinal axis and a lateral axis extending perpendicular to the longitudinal axis.

16. The fuel device assembly of claim 15, wherein the rim further comprises a plurality of upstanding walls, the plurality of upstanding walls extending between the curvilinear edge and the upper end of the canister to further define the pair of openings.

17. The fuel device assembly of claim 16, wherein pivoting of the upper float relative to the lower float about a vertical axis extending perpendicular to the lateral axis and the longitudinal axis is restricted by contact of one of the pair of legs against an adjacent one of the plurality of upstanding walls.

18. A vehicle comprising:
 a fuel tank defining an interior; and
 a fuel device assembly provided within the interior of the fuel tank, the fuel device assembly comprising:
  a valve assembly comprising:
   a case having an upper end, an opposite lower end, and an open interior;
   a bottom cap provided at the lower end of the case;
   a lower float provided within the open interior of the case, the lower float comprising:
    a canister having an upper end; and
    a rim extending from the upper end of the canister, a pair of openings formed within the rim adjacent the upper end of the canister and partially defined by a curvilinear edge;
   an upper float provided within the open interior of the case between the canister of the lower float and the upper end of the case, the upper float including a pair of legs, each leg received within a corresponding opening; and
   a biasing member biasing the lower float and the upper float toward the upper end of the case;
  a valve cover provided at the upper end of the case; and
  a weld plate provided at an upper end of the valve cover coupling the valve assembly to an interior-facing surface the fuel tank.

19. The vehicle of claim 18, wherein the upper float includes an upper float body extending between the pair of legs and a protrusion extending from a lower surface of the upper float body, the lower float has a cavity formed therein and a through hole extending through the cavity, and the protrusion of the upper float is partially received within the cavity to permit the upper float to pivot relative to the lower float.

20. The vehicle of claim 18, wherein the pair of legs are provided on opposite sides of the upper float and provided along a longitudinal axis of the upper float, the upper float is pivotable relative to the lower float about the longitudinal axis and a lateral axis extending perpendicular to the longitudinal axis.

\* \* \* \* \*

UNITED STATES PATENT AND TRADEMARK OFFICE
CERTIFICATE OF CORRECTION

PATENT NO. : 12,233,707 B2
APPLICATION NO. : 17/665095
DATED : February 25, 2025
INVENTOR(S) : Alexander Thaden, Caleb Bauer and Steven Yurgalonis It is certified that error appears in the above-identified patent and that said Letters Patent is hereby corrected as shown below:

On the Title Page

Item (71), applicant, city, delete "Kiyosu (JP)" and insert --Kiyosu-shi Aichi-ken (JP)--, therefor.

Item (73), assignee, city, delete "Kiyosu (JP)" and insert --Kiyosu-shi Aichi-ken (JP)--, therefor.

In the Specification

In Column 1, Line(s) 22, delete "an" and insert --and--, therefor.

In Column 3, Line(s) 63, delete "allows" and insert --allow--, therefor.

In Column 5, Line(s) 11, after "171", insert --.--.

Signed and Sealed this
Seventh Day of October, 2025

John A. Squires
*Director of the United States Patent and Trademark Office*